(12) United States Patent
Weaver, III et al.

(10) Patent No.: US 7,069,449 B2
(45) Date of Patent: Jun. 27, 2006

(54) METHOD AND SYSTEM FOR ENCRYPTING AND STORING CONTENT TO A USER

(75) Inventors: J. Dewey Weaver, III, Raleigh, NC (US); Douglas K. Leech, Raleigh, NC (US)

(73) Assignee: Itech Group, Inc., Raleigh, NC (US)

(*) Notice: Subject to any disclaimer, the term of this patent is extended or adjusted under 35 U.S.C. 154(b) by 552 days.

(21) Appl. No.: 09/921,620

(22) Filed: Aug. 3, 2001

(65) Prior Publication Data

US 2002/0018568 A1    Feb. 14, 2002

Related U.S. Application Data

(60) Provisional application No. 60/222,804, filed on Aug. 3, 2000.

(51) Int. Cl.
*H04L 9/34*    (2006.01)

(52) U.S. Cl. ...................... 713/193; 370/486
(58) Field of Classification Search ............... 713/193; 455/4.2; 370/486, 535; 386/108, 34; 348/460, 348/473
See application file for complete search history.

(56) References Cited

U.S. PATENT DOCUMENTS

| | | | |
|---|---|---|---|
| 4,558,176 A | 12/1985 | Arnold et al. | |
| 4,706,121 A | 11/1987 | Young | |
| 4,937,866 A | 6/1990 | Crowther et al. | |
| 5,412,416 A * | 5/1995 | Nemirofsky | 725/36 |
| 5,548,646 A | 8/1996 | Aziz et al. | |
| 5,606,609 A | 2/1997 | Houser et al. | |
| 5,665,079 A | 9/1997 | Stahl | |
| 5,822,676 A * | 10/1998 | Hayashi et al. | 725/114 |
| 5,995,625 A * | 11/1999 | Sudia et al. | 705/51 |
| 6,058,389 A | 5/2000 | Chandra et al. | |
| 6,073,138 A | 6/2000 | De L'Etraz et al. | |
| 6,088,731 A | 7/2000 | Kiraly et al. | |
| 6,205,485 B1 | 3/2001 | Kikinis | |
| 6,233,389 B1 | 5/2001 | Barton et al. | |
| 6,289,455 B1 | 9/2001 | Kocher et al. | |
| 6,418,421 B1 * | 7/2002 | Hurtado et al. | 705/54 |
| 6,580,462 B1 * | 6/2003 | Inoue et al. | 348/460 |
| 6,608,832 B1 | 8/2003 | Forslow | |
| 2002/0104099 A1 | 8/2002 | Novak | |
| 2005/0108747 A1 | 5/2005 | Omoigui | |

FOREIGN PATENT DOCUMENTS

| | | |
|---|---|---|
| WO | PCT/US01/24319 | 9/2000 |
| WO | PCT/US01/24320 | 9/2001 |
| WO | PCT/US01/2451 | 10/2001 |

* cited by examiner

*Primary Examiner*—Kim Vu
*Assistant Examiner*—T. B. Truong
(74) *Attorney, Agent, or Firm*—A. Jose Cortina; Daniels Daniels & Verdonik, P.A.

(57) ABSTRACT

Systems and methods are provided for encrypting content sent to a user. The user terminal is assigned a serial number. When content is received by the user terminal, it is encrypted and the serial number is embedded into the encrypted content. The content is decrypted if the serial number embedded in the encrypted content is the serial number associated with the user terminal. Content may also be simultaneously stored and displayed.

15 Claims, 8 Drawing Sheets

METHOD AND SYSTEM FOR ENCRYPTING AND STORING CONTENT TO A USER

CROSS REFERENCE TO RELATED APPLICATIONS

This application is related to and claims priority to U.S. Provisional Application No. 60/222,804 filed Aug. 3, 2000, and entitled, "Universal Digital Tuner System for Personal Computers." This application is related to two applications filed simultaneously herewith entitled, "Method and System for Program Guide Delivery," and "Method and System for Controlling Content to a User." The above applications are hereby incorporated by reference herein in their entirety.

BACKGROUND OF THE INVENTION

1. Field of the Invention

The invention relates to a system and method for encrypting content sent to a user. Content includes any electronic file or application, including video, audio, datacast, video games, and other computer programs. More specifically, the invention relates to software for encrypting packets received at a user terminal and restricting decryption of the packets to the user terminal where the packets were received and encrypted.

2. Description of the Background

Media content is sent to users in a variety of methods. For example, terrestrial television signals are broadcast through the airwaves using a radio frequency signal, which is received by a user with a receiver connected to a television display. A terrestrial television receiver includes an antenna for receiving the signal, which must be placed in a position where it can receive the signals. Television reception from a radio frequency signal is often poor if the user is located far from the signal broadcast or if the user has difficulty placing the antenna in the correct position to receive the signal. Radio frequency signals received by a television set are also sent to all television receivers in a geographic area, and therefore it is not possible to control which users have access to specific media content. It is also difficult to monitor what content users are viewing.

Cable broadcasts employ a path to a user terminal without many of the interferences of terrestrial television. Satellite offers a digital representation of a signal with more of a line-of-sight path to the user terminal. As used herein, a "user terminal" is an electronic device for receiving media content such as a television, personal computer ("PC") or set top box. Cable and satellite broadcasters are also able control which users have access to specific content. Cable and satellite broadcast signals may be encrypted, or "scrambled," such that only users with a de-encryption code or "key" may view the content.

By controlling which users are allowed to view content, cable and satellite broadcasters are able to charge users based on the content that the viewer wishes to receive. For example, cable and satellite providers often charge a set periodic fee, normally a monthly fee, for a content package. Each content package contains a specified number of channels to which the user is given access for a set fee. In addition, cable and satellite broadcasters can charge users to see a single program. In other words, if a user wants to see a specific movie, he or she can order the movie on a "pay-per-view" basis.

Such present day conventional televisions use, for example, NTSC or PAL system signals, and provide fairly good color pictures if receiving conditions are good. Such pictures, however, do not come close to having the sharpness, realism and visual impact as might be found, for example, in a motion picture film or a magazine-quality picture. To provide dramatically better television picture quality, experimental studies have been performed and components have been developed in an attempt to provide digital television pictures that approach the quality of a 35-millimeter color film. Such high-resolution television had been deemed especially advantageous for use, for example, in wide-screen theater and home television projection, and for theatrical motion picture production and projection using magnetic tape instead of film.

Several High-definition Digital Television, i.e., "HDTV" systems have already been proposed, the parameters of which are generally disclosed in a number of articles. In such systems, the lines per frame range from 1023 to 2125, the aspect ratios (picture width to picture height) range from 4:3 to 16:9 and luminance bandwidths range from 20 to 50 MHz. Recommendations have been made that an HDTV signal should be capable of standards conversions that would provide service to NTSC, PAL and SECAM domestic services.

Other techniques labeled as either high-definition or high-resolution television systems have modified the transmission of the conventional television signal to, for example, provide increased horizontal line resolution or better luminance resolution with less objectionable sub-carrier pattern.

Yet still another technique for improving the horizontal and vertical definition and reducing low frequency flicker in a conventional picture involves using digital signal processing technologies. Offset sampling is used to improve horizontal definition, and a double-rate stored image readout at the receiver selects the appropriate signal portions to subjectively increase the vertical definition and reduce low frequency (25 Hz) flicker.

Because of these efforts, high-definition digital television signals may eventually be delivered as the standard throughout the United States.

Like a standard television signal, HDTV may be broadcast over radio frequency ("RF") airwaves, cable or satellite. However, to view an HDTV broadcast, users must buy an HDTV display and HDTV tuner. HDTV's are prohibitively expensive for many users when compared to standard television sets.

Simultaneously with the developments in high definition television, there has been an explosion in use and delivery of information, images, etc. through the Internet. As Internet broadband applications have grown, there has been a convergence between the Internet and conventional television. Thus, it is foreseen that eventually conventional television programming and permutations thereof, will be delivered to consumers through the Internet directly via broadband connectivity onto their computer monitor.

In addition, techniques are being developed to increase user control over the display of media content. One system currently available under the brand name "Tivo™" receives a standard television signal, simultaneously stores and displays the signal, and accepts user inputs such that the broadcast signal may be paused, rewound, or replayed based on user inputs. The system converts a standard television signal into Moving Pictures Experts Group ("MPEG") format and parses the MPEG stream into video and audio components. The audio and video components are stored and then reassembled and decoded for delivery to a television receiver for display. The system accepts inputs from a user which controls when the stored, disassembled MPEG stream is reassembled, decoded and displayed. Such a system is described in U.S. Pat. No. 6,233,389, which is hereby incorporated in its entirety by reference. However, this technique is not applicable to a digital media environment.

In addition, current content distribution does not provide adequate control to send specific content to specific users and encrypt the content at the user level to avoid unauthorized distribution. These and other problems are avoided and numerous advantages are provided by the system and method described herein.

SUMMARY OF THE INVENTION

In accordance with the invention, systems and methods for encrypting content received by a user terminal are provided to enable personal computers (PCs) to tune, receive, record, encrypt, and display digital television, including HDTV on their computer monitor, or to a connected digital display. The system includes a web portal, server database, and client application for control, interaction, and communication between and across the Internet, analog and digital transport streams (all audio, video, and data transport streams), and the PC. A method for encrypting the content after it is sent to the user terminal is provided. The user terminal has a serial number associated therewith. The encrypted content has a user serial number embedded such that the content is decrypted only if the serial number of the user terminal decrypting the content is the same as the user terminal that encrypted the content.

In one aspect, a user terminal is assigned a serial number. The serial number is a unique identifier. The user terminal receives and encrypts content. The user terminal also embeds the serial number in the encrypted content. The content is decrypted if the serial number embedded in the encrypted content is the serial number associated with the user terminal.

The serial number may be embedded in a packet "tag." As used herein, the term "tagging" means a marker inserted into data or into the packet ID. A packet can be tagged with various types of information, including the serial number(s) of users who have the ability to view the content of the packets. A packet is a short block of data transmitted in a packet switching network environment. "Packet switching" is a protocol in which data bits are organized in packets before it is routed. Each packet is then transmitted individually and can follow different routes to its destination. Once all the packets forming a message arrive at the destination, they are recompiled into the original data. The destination of the data is contained in the packet ID. When reassembled, the packets include content. The term "content" refers to any electronic file or application, including video, audio, datacast, video games, and other computer programs.

In another aspect, the user terminal encrypts the content by wrapping the content. "Wrapping" refers to using a first piece of code, or a "wrapper," which is combined with a second piece of code to determine how the first code is executed. The wrapper acts as an interface between the second code and the first "wrapped" code. A wrapper adds security, e.g. to prevent a calling program from executing certain functions. Thus, the wrapped code can only be accessed via the wrapper. In yet another aspect, the user terminal encrypts the content by scrambling the content.

In still another aspect, the user terminal stores the content. Preferably, the user terminal simultaneously stores and displays the content. More preferably, the user terminal displays the content at any point in time after it has been stored.

In yet another aspect, a system for encrypting content to a user is provided. The system comprises a user terminal, content receivable by the user terminal and a processor module configured to implement the method described above.

The invention provided encrypts content on a user terminal such that only the user terminal that received and encrypted the content may decrypt the content. Therefore, content cannot be copied and distributed outside the user terminal, for example, with the user serial number where the content was originally received and encrypted.

These and other advantages will become apparent to those of ordinary skill in the art with reference to the detailed description and drawings.

DETAILED DESCRIPTION

Systems and methods are provided for encrypting the content sent to a user. Digital content is sent in packets, which include a packet ID and content. The packet ID is tagged, or marked with a packet tag by a broadcaster or other computer server to enable specific users to view the content. The packets are sent by either a computer server or a broadcaster to the user terminal. The "packet tag" is an identifier that marks and identifies the content associated with the packet. The packet tag may also include information about the user terminal to which it is sent, such as a user serial number associated with the user terminal. The packet tag is used by software applications, or "modules," for controlling the content at the user terminal. The software applications enable user viewing permissions according to the packet tags, which may include providing access to a decryption algorithm if the user serial number is included in the tag, and recording information about the content if the content is viewed or read by the user terminal.

As used herein, a "module" refers to a software program, application, routine, or subroutine, or a programmable processor or chip. As would be understood by one of ordinary skill in the art, modules may be configured in many combinations to accomplish the same function. For example, an example of a software module is any block of code that may be logically grouped together and may or may not use the conventional subroutine interfaces as defined by typical programming languages. A program routine or subroutine is generally understood as a stylistic convention of programming, and thus different routines or subroutines may be written in multiple combinations and accomplish the same function. As used herein, a "module" includes any block of code or programmable processor or chip having a function that may be logically grouped together regardless of whether conventional subroutine interfaces as defined by typical programming languages are used or specific processors or chip configurations are used.

Figure 1:
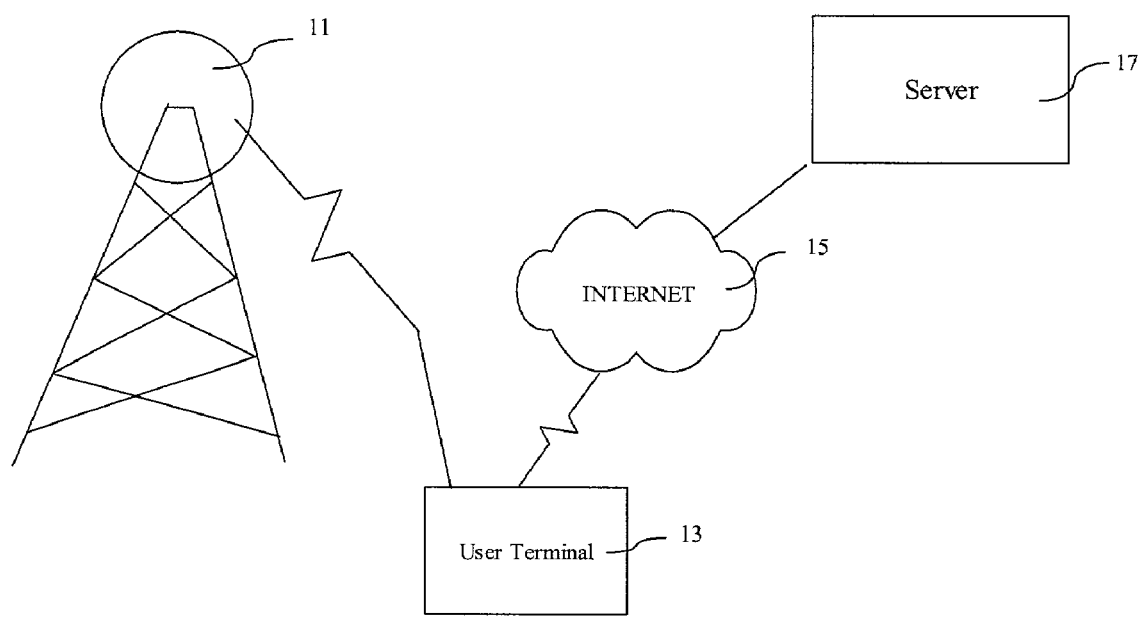
FIG. 1 is a block diagram of an embodiment of a system.

FIG. 1 is a block diagram of a system according to the invention. The system includes a broadcast station 11. The broadcast station 11 sends content to a user terminal 13. The content is broken into packets, each having a packet ID containing a destination address, and sent to the user terminal 13. The content includes any electronic file or application, including video, audio, datacast, video games, and other computer programs. Preferably, the content is in motion picture expert group ("MPEG") format. As used herein, "MPEG" includes any version of MPEG format, including MPEG2 format.

The user terminal 13 includes a hardware serial number that identifies the hardware included in the user terminal 13. The user terminal 13 is in communication with a web portal to the Internet 15. The user terminal 13 is a personal computer ("PC") or a set top box or other electronic device for receiving content. In addition, any computer network such as a local area network ("LAN") or wide area network ("WAN") may be substituted for the Internet 15.

The user terminal 13 is in communication with a server 17 through the Internet 15. As will become better understood by the following discussion, the server contains information about users such as user serial numbers and subscription information. The subscription information includes the content ordered by the user, for example, specific channels, "pay-per-view" programs, or video games. The subscription information also includes whether the user has paid for the content or is past due on payments.

Alternatively, content may be sent by other means, for example, cable television ("CATV"), satellite television ("SATV"), or the world wide web.

Figure 2:
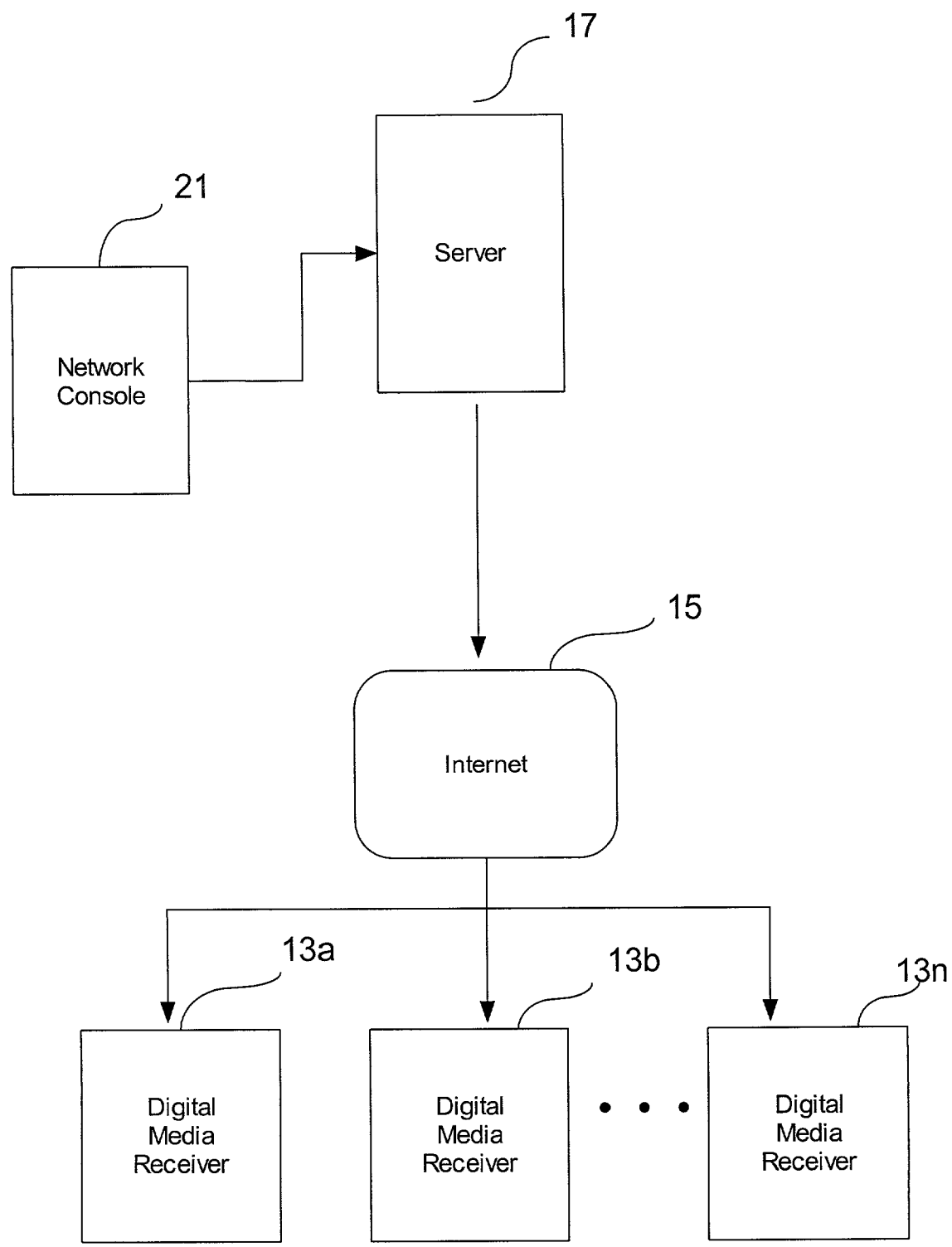
FIG. 2 is a block diagram of a network of user terminals connected by the Internet to the server.

FIG. 2 is a block diagram of a network of user terminals 13a–13n connected by the Internet 15 to the server 17. The server 17 is in communication with a network console 21. The network console accepts inputs from an administrator. The inputs include user information and content information.

Figure 3:
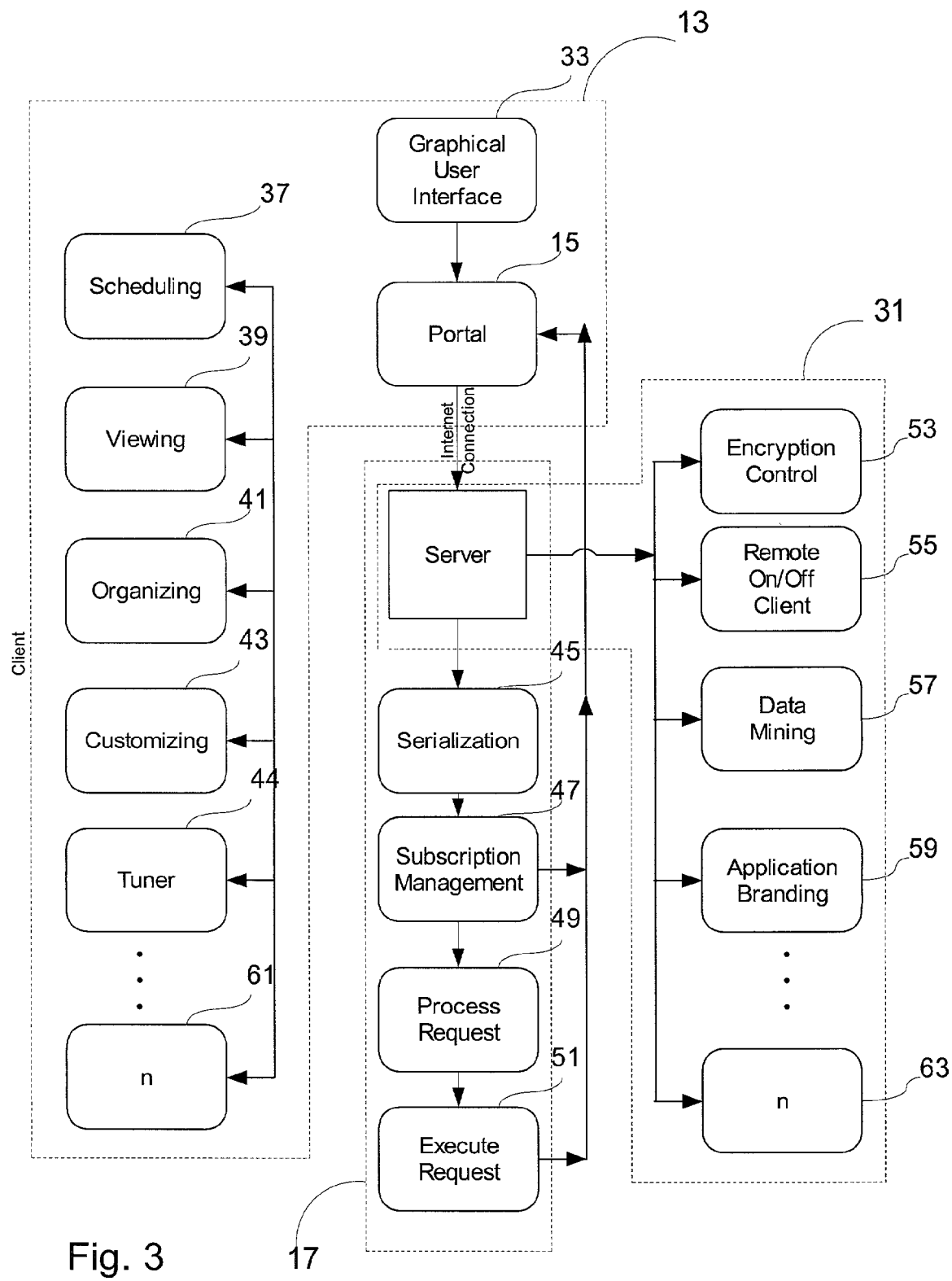
FIG. 3 is a block diagram of an embodiment of a system.

FIG. 3 is a detailed block diagram of an embodiment of a system in accordance with the invention. The user terminal 13 is in communication with the server 17 through the Internet 15.

The server 17 includes a serialization module 45. The serialization module 45 includes a list of the user serial numbers, and information about each serialized receiver. The serialization module 45 performs authorization checks by checking if the user serial number corresponds to a user that has access to certain content or content information. The subscription management module 47 contains user information. The user information includes the subscription ordered or paid for by the user and a corresponding user serial number. The server 17 also includes a process request module 49 and an execute request module 51. The process request module 49 receives requests from a user or an administrator to enable or disable content viewing permissions. The process request module 49 includes processing payment information, such as credit card sales, from the user. The execute request module 51 performs the users request if the user has properly paid for the requested service. The execute request module 51 sends information to the user terminal 13 through the Internet 15. The information sent by the execute request module 51 includes content schedules and user viewing permission enablement information. The processing and execution of requests will be better understood by the following discussion.

The server 17 is in communication with a secondary server 31. The execute request module 51 obtains information regarding schedules and user viewing information from a secondary server 31. The secondary server 31 may be included in the same physical server machine as the server 17 or the secondary server 31 may be a separate machine. The secondary server includes an encryption control module 31, a remote on/off module 55, a data mining module 57, and an application branding module 59. The secondary server may include other modules 63.

The encryption control module 31 sends encryption keys to the user terminal 13 to enable viewing permissions. For example, the user requests a specific program ("content"), and sends this information to the process request module 49. The execute request module 51 requests the appropriate encryption keys from the encryption control module 31 to enable the user viewing permission. The execute request module 51 sends the appropriate encryption key to the user terminal 13. Preferably, the encryption key includes the user serial number such that the encryption key only works if used by the user terminal corresponding to the user serial number.

The remote on/off module 55 sends information to the user terminal 13 to turn viewing permission on or off remotely. For example, an administrator can terminate a user's viewing permission by entering the request into the process request module 49. The execute request module 51 communicates with the remote on/off module 55 to turn off all of the user's viewing permissions. The remote on/off module communicates with the user terminal 13 via the Internet or via datacast to either delete content files, delete applications for viewing the content files, or to disable the encryption keys.

The data mining module 57 receives information about user viewing habits and subscription information and searches for relationships among the data collected. The data mining module 57 may use conventional analysis techniques to monitor data collected. For example, when the user views specific content from the user terminal 13, information about the content viewed is sent to the server 17 by the Internet 15 and stored by the server 17. The information about the content viewed includes the content and the time the content was viewed. This information may be collected about many user terminals. The data mining module 57 receives the information and analyzes it for relationships. For example, the data mining module 57 might determine that users who view stock car races regularly are also likely to view a high number of symphony concerts. This information could be of interest to advertisers, who might have been unaware of the correlation between stock car racing and symphony concert viewers. Based on such a correlation, advertisers may decide to advertise stock car racing and related merchandise during symphony concert broadcasts.

The application branding module 59 communicates branding information to the user terminal 13. The branding information includes which commercials should be sent to the user terminal 13 and which advertisements should be displayed on the user terminal 13. The branding information may be based on instructions from an administrator to the server 17 and can include correlations derived from the data mining application 57. For example, an administrator can input a request to the process request module 49 to have a banner offering stock car racing merchandise for sale displayed on the user terminal 13 if the user watches more than a predefined number of stock car races.

The server may include other modules 63 for processing and analyzing data received from the user terminal 13.

The user terminal 13 displays a graphical user interface ("GUI") 33 which displays information to a user and receives inputs from a user. The user terminal includes a scheduling module 37. The scheduling module 37 includes information about the content sent to the user terminal 13 and a display mechanism for showing schedules of content on the GUI 33. The content information includes the schedule of content, descriptions of content, and related web sites. The display mechanism shows a schedule of content on the GUI 33 and may include links to web sites related to the content displayed.

The viewing module 39 displays content to the user on a display or GUI 33. Content, which comprises tagged packets, is viewed by the viewing module 39, and the packet information is sent from the user terminal 13 to the server 17 by the Internet 15. As previously discussed, information about the viewed content may be analyzed by the server 17, and more specifically, by the data mining module 57.

The organizing module 41 organizes content based on user specifications. For example, the user may enter a request through the GUI 33 to see a schedule of every stock car race available. The organizer module 47 would display such a schedule.

The customizing module 43 customizes the content based on user specifications. The customizing module accepts inputs from the user to define search and query functions. For example, a user can define criteria and the customizing module 43 will search the content information for content that matches the user-defined criteria.

The tuner module 44 tunes broadcasts received by the user terminal 13. Tuning refers to choosing a particular channel or specific content to be downloaded or received by the user terminal 13. The operation of the tuner module is described in greater detail in FIG. 8 and the accompanying discussion.

The user terminal 13 may include additional modules 61 for controlling and viewing content.

Figure 4:
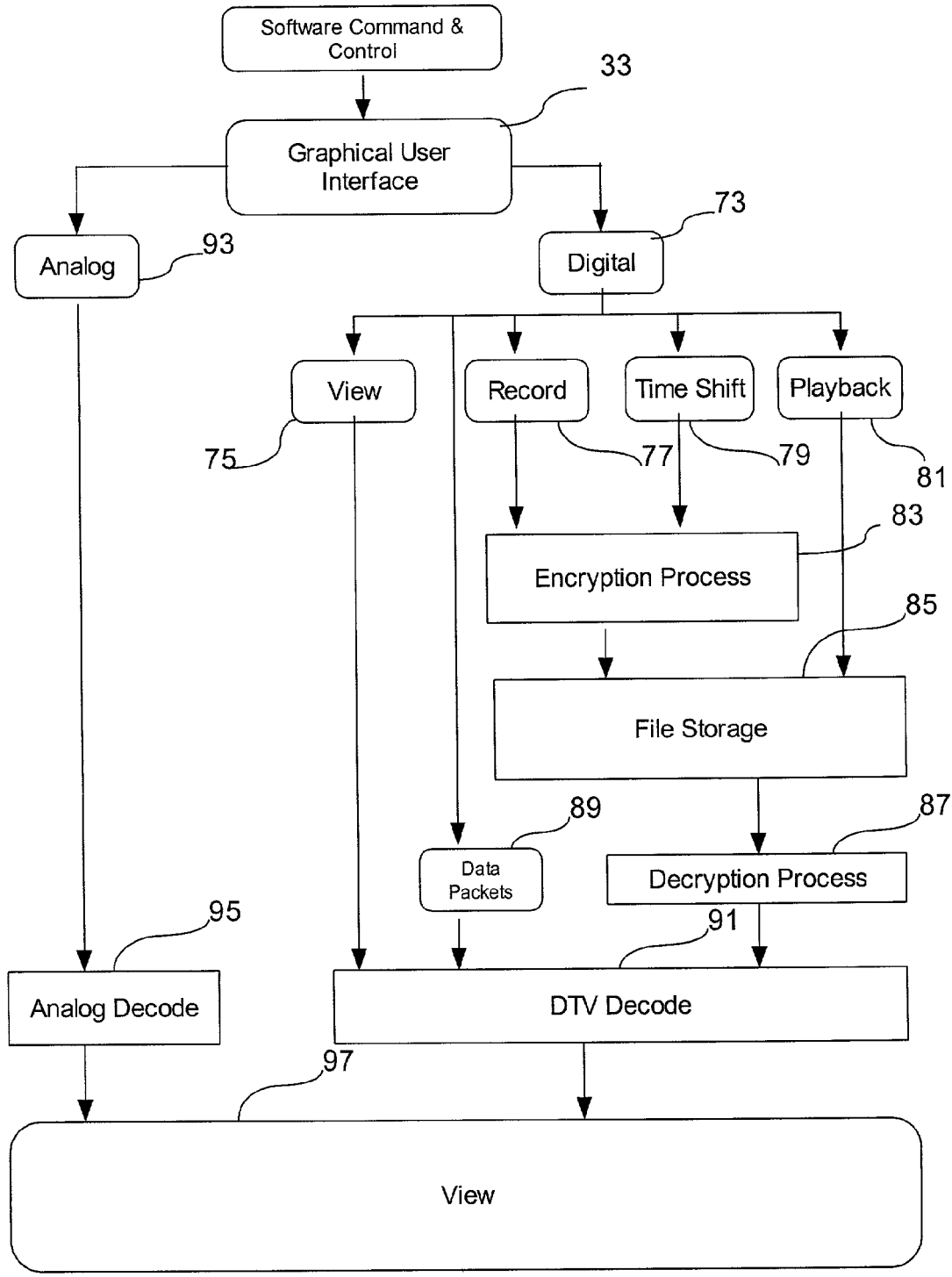
FIG. 4 is a flow diagram of an embodiment of the user terminal showing steps for receiving, viewing, and recording content.

FIG. 4 is a block diagram of an embodiment of the user terminal 13 showing steps for receiving, viewing, and recording content. The user terminal 13 includes a GUI 33. Analog content 93 is received and decoded at step 95. The analog content 93 is then viewed at step 97. Digital content 73 is also received by the user terminal 13. The user can input instruct the GUI to either view the digital content 73 at step 75, record the digital content 73 at step 77, "time shift" the digital content 73 at step 79, or playback the recorded digital content 73 at step 81. The user chooses the input options from a menu displayed by the GUI. The user chooses either step 75, 77, 79, or 81 by entering an option into the menu from a keyboard, touch sensitive screen, or mouse.

If the user instructs the GUI 33 to view digital content at step 75, the signal is decoded at step 91 and viewed at step 97. If the user instructs the GUI 33 to record digital content at step 77 or to time shift the content at step 79, the content is encrypted at step 83 and stored as a file in file storage 85. When the user instructs the GUI 33 to play back the content at step 81, the content is retrieved from file storage 85 and decrypted at step 87. The decrypted file is digitally decoded at step 91 and viewed at step 97. Alternatively, the encryption and decryption at steps 83 and 87, respectively, may be omitted. If the encryption and decryption steps are omitted, the content is stored as a file in file storage 85 without being encrypted at step 83. Unlike the methods and systems described in U.S. Pat. No. 6,233,389, the content is not parsed into audio and video signals. The file is decoded at step 91 without being decrypted at step 87 and viewed at step 97, subject to the user's choice in input options to view the digital content 73 at step 75, record the digital content 73 at step 77, "time shift" the digital content 73 at step 79, or playback the recorded digital content 73 at step 81.

Figure 5:
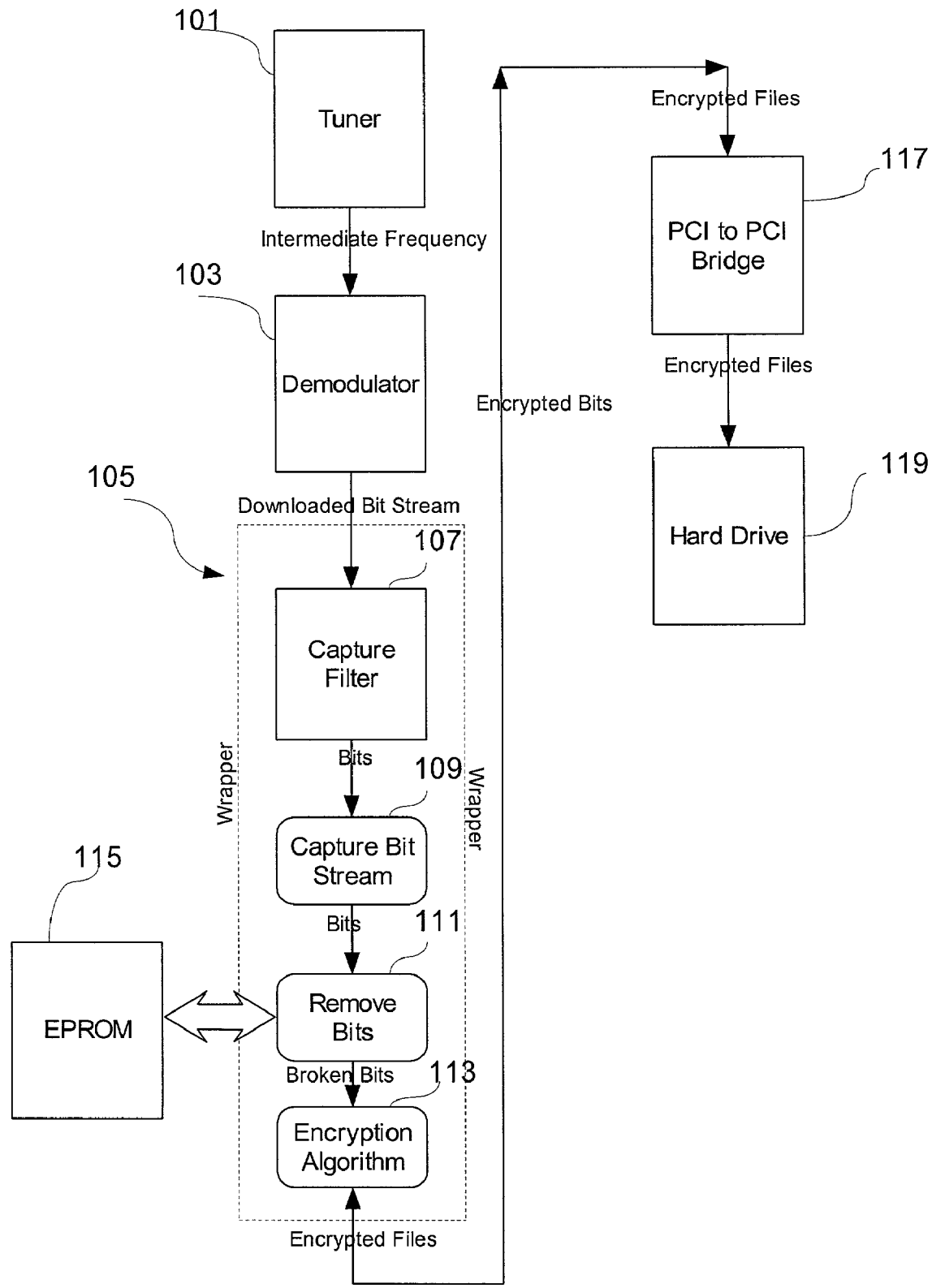
FIG. 5 is a block diagram of the encryption elements.

FIG. 5 is a block diagram of the encryption elements. A tuner 101 receives content, preferably from a broadcaster. An example of a tuner for receiving content on a PC is a digital television PC ("DTVPC") card such as a DTVPC card available under the trade name Janus. The signal is sent to a demodulator 103 where it is downloaded into a bit stream. The bit stream is put in a wrapper 105. A wrapper is data that precedes or frames the main data or program. The wrapper sets up another program so that the data can be read or so that the program can run successfully.

The bit stream is sent as input to a capture filter 107. The capture filter 107 identifies bits from the demodulator 103 before sending the bits to the appropriate destination. The bits are recorded or capture by a capture bit stream module 109. Bits are removed from the bit stream by a remove bits module 111. By the term "removed," it is meant that bits are scrambled according to the encryption algorithm.

An encryption algorithm module 113 retrieves an encryption algorithm from electronic programmable read only memory ("EPROM") 115. As would be understood by one of ordinary skill in the art, EPROM is typically included on a processor. In the embodiment illustrated in FIG. 5, EPROM is included on the user terminal. The encryption algorithm module 113 encrypts the files, which are then sent to a Peripheral Component Interconnect ("PCI") 117 for storage on a hard drive 119.

Figure 6:
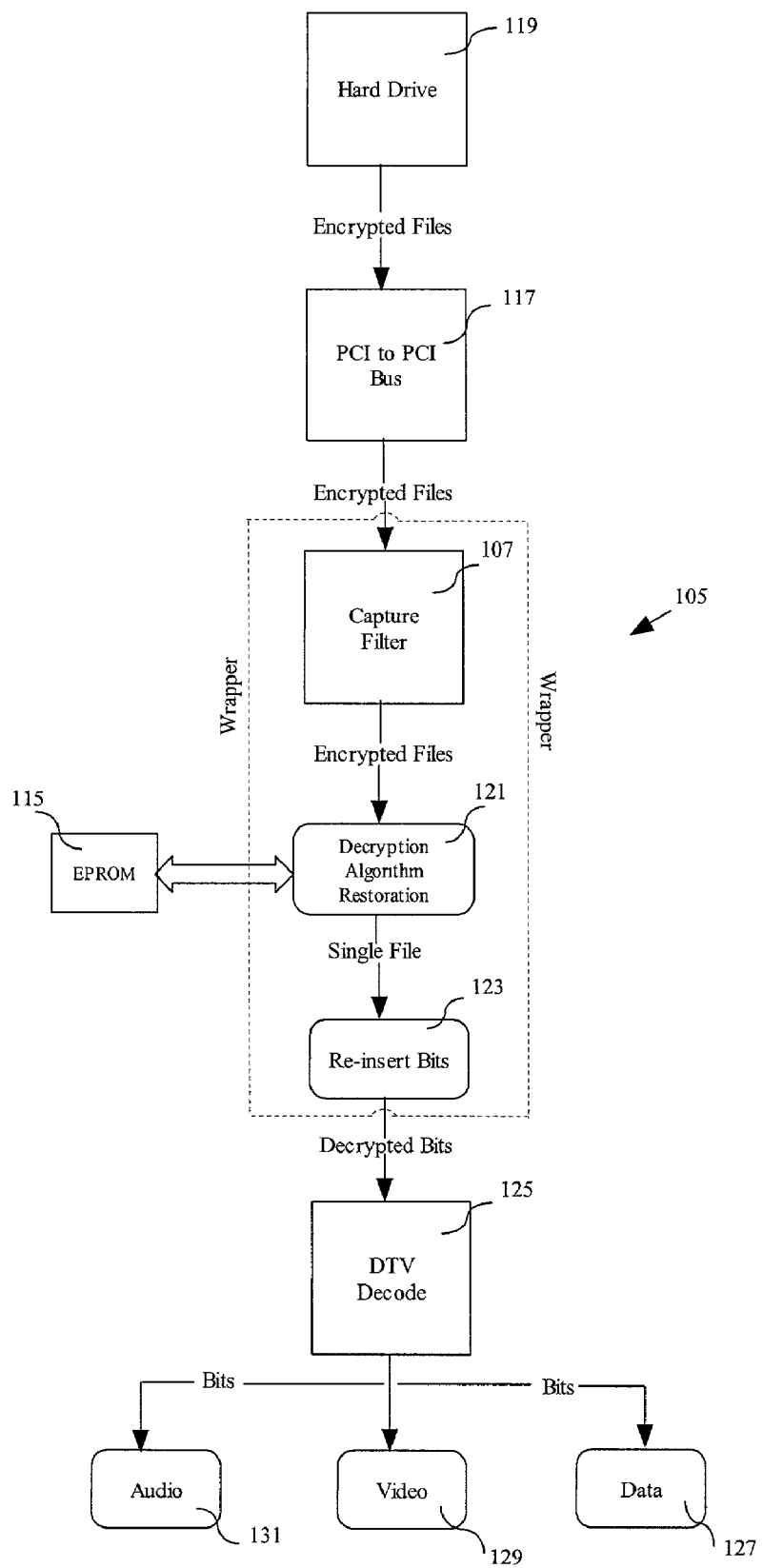
FIG. 6 is a block diagram of the decryption elements.

FIG. 6 is block diagram of the elements of the decryption process. The encrypted files are retrieved from the hard drive 119 through a PCI 117. The wrapper 105 is removed by the following elements. The encrypted files are sent as input to a capture filter 107. This capture filter 107 identifies bits from the point of origin, such as a storage medium, before sending the bits to a destination, such as a decoder. The decryption algorithm restoration module 121 retrieves the decryption algorithm from the EPROM 115. The bits are re-inserted by the re-insert bits module 123. By the term "re-insert," it is meant that bits are unscrambled, or placed back in the order of the bit stream prior to encryption.

A DTV decode module 125 decodes the decrypted bits into audio bits 131, video bits 129 and data bits 127. The audio bits 131, video bits 129 and data bits 127 may be viewed at the user terminal.

Figure 7:
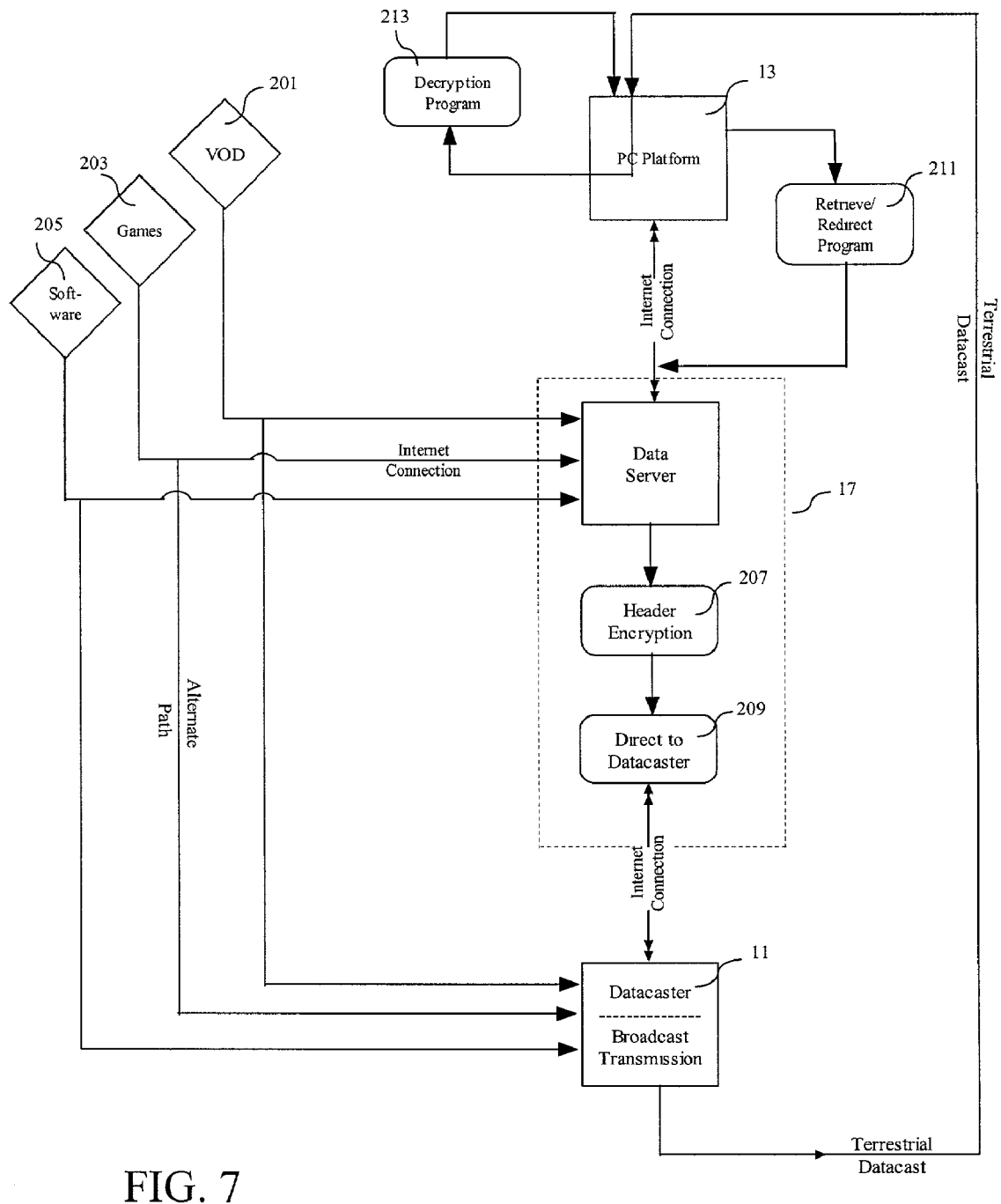
FIG. 7 is a block diagram of an embodiment of a system.

FIG. 7 is a block diagram of an embodiment of the system. Content, "video-on-demand" 201, computer games 203, and other types of software 205 are sent by an Internet connection to a server 17. Alternatively, the video-on-demand" 201, computer games 203, and other types of software 205 may be sent to a broadcaster 11. The "video-on-demand" 201, computer games 203, and other types of software 205 is then sent to the user terminal 13 from the server 17 by an Internet connection, or from the broadcaster 11 by terrestrial means. Terrestrial means includes cable, satellite, and radio frequency (RF) signals.

The server 17 includes a header encryption module for encrypting the content into encrypted packets. The server 17 and the broadcaster 11 are in communication by an Internet connection. Therefore, the encrypted packets may be transferred from the server 17 directly to the user terminal 13, or the encrypted packets may be sent to the broadcaster 11 and then sent to the user terminal 13.

The user terminal 13 is in communication with a decryption module 213. The decryption module 213 decrypts the packets such that the user can view the "video-on-demand"

201, computer games 203, and other software 205. Preferably, the header encryption includes a tag with the user serial number. The decryption module 213 checks the header encryption for the tag with the user serial number. If the user serial number is not included in the tag, the decryption module 213 does not decrypt the packet. Alternatively, the decryption module 213 can delete packets that do not include a tag with the user serial number.

Figure 8:
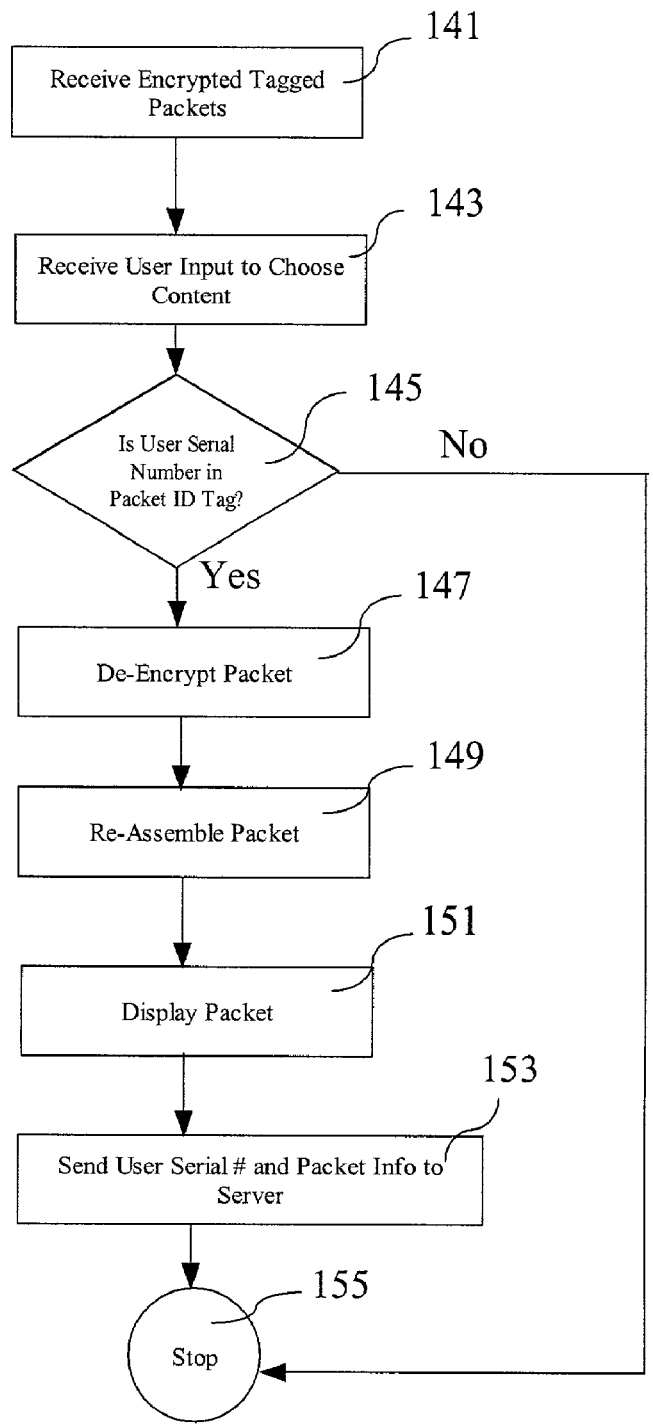
FIG. 8 is a flow diagram of an embodiment of the user terminal.

FIG. 8 is a flow diagram of an example of the user terminal's processing of content packets through the tuner module. The relationship of the tuner module 44 in a system is depicted in FIG. 3. At step 141, the user terminal receives encrypted, tagged packets. The tag includes the serial numbers for users who have permission to view the content in the packet. The user terminal receives user input choosing which content to view or record at step 143. The user input may be received through conventional means, such as a GUI, keyboard, mouse, or touch screen. The input is received by the tuner module.

The tuner module checks the packet ID tag for the serial number of the user terminal at step 145. If the user serial number is not in the packet ID tag, the tuner module ends at step 155 without displaying or recording the content associated with the packet.

If the user serial number is in the packet ID tag, the tuner module de-encrypts the packet at step 147, reassembles the packet bits at step 149, and displays the packet at step 151. At step 153, the tuner module sends the user serial number and packet information to the server. The packet information includes the information identifying the content associated with the packet and the time at which the user viewed the content. The tuner module is finished at step 155.

It will be apparent to those with skill in the art that there are many alterations that may be made in the embodiments of the invention described above without departing from the spirit and scope of the invention. For example, there are many ways that circuits and electronic elements may be combined to implement the system and method described herein in various systems and hardware environments. There are similarly many ways that independent programmers might provide software to provide the functionality associated with the present invention as taught herein without departing from the spirit and scope of the invention.

Having thus generally described the invention, the same will become better understood from the following claims in which it is set forth in a non-limiting manner.

The invention claimed is:

1. A method for encrypting content to a user, comprising:
receiving content at a user terminal, said content being a broadcast medial signal;
demodulating the broadcast signal and creating a downloadable bit stream;
at the user terminal, placing the downloaded bit stream into a wrapper;
before storage, randomly recovering bits according to a predetermined unique encryption algorithm with the user terminal assigned a unique identifier that dictates its unique encryption algorithm;
embedding the terminal identifier and encrypting it within the encryption algorithm and storing it within the content when stored; and
decrypting the content if the terminal identifier embedded in the encrypted content is the terminal identifier associated with the user terminal.

2. The method of claim 1, wherein said encrypting further comprises:
wrapping the content.

3. The method of claim 1, wherein said encrypting further comprises:
scrambling the content.

4. The method of claim 1, wherein the content comprises bits.

5. The method of claim 1, further comprising:
storing the content.

6. The method of claim 1, further comprising:
simultaneously storing and displaying the content.

7. The method of claim 1, further comprising:
simultaneously storing and displaying the content
receiving commands from a user, wherein the commands affect the time at which the content is displayed.

8. A method for staring and retrieving content to a user, comprising:
receiving content in the form of a digital media signal at a user terminal, said content being a broadcast signal;
demodulating the broadcast signal and creating a downloadable bit stream;
at the user terminal, placing the downloaded bit stream into a wrapper;
before storage, randomly removing bits according to a predetermined unique encryption algorithm with the user terminal assigned a unique identifier that dictates its unique encryption algorithm;
embedding the terminal identifier and encrypting it within the encryption algorithm and storing it within the content when stored;
simultaneously storing and displaying the content at a user terminal; and
receiving commands from a user, wherein the commands affect the time at which the content is displayed.

9. A system for storing and retrieving content to a user comprising:
a user terminal;
a tuner in communication in said user terminal configured for receiving content which is a broadcast media signal, in the form of a digital media signal;
a processor module in communication with said user terminal, wherein the processor module is configured to assign a unique identifier to said user terminal, receive said content, encrypt said content, embed the unique identifier in said content at the user terminal, and decrypt said content if the unique identifier embedded in the encrypted content is the unique identifier associated with the user terminal, said processor being further configured for prior to encrypting said content, demodulating the broadcast media signal and creating a downloadable bit stream, at the user terminal, placing the downloadable bit stream into a wrapper, before storage, randomly removing bits according to a predetermined unique encryption algorithm with the user terminal assigned the unique identifier that dictates its unique encryption algorithm, and embedding the terminal identifier and encrypting it, within the encryption algorithm and storing it within the content for storage therewith;
a storage device for in communication with said user terminal, for storing the content simultaneous to the displaying of the content;
a display in communication with said user terminal for displaying the content; and
wherein said user terminal is configured for receiving commands from a user, wherein the commands affect the time at which the content is displayed at the user terminal.

10. A system for encrypting content to a user, comprising:

a user terminal;

content which is a broadcast media signal receivable by said user terminal; and a processor module in communication with said user terminal, wherein said processor module is configured to assign a unique identifier to said user terminal, receive said content, encrypt said content, embed the unique identifier in said content at the user terminal, and decrypt said content if the serial number embedded in the encrypted content is the serial number associated with the user terminal, said processor module further configured prior to encrypting said content, for demodulating the broadcast media signal and placing the downloadable bit stream into a wrapper, before storage, randomly removing bits according to a predetermined unique encryption algorithm with the user terminal assigned a unique identifier that dictates its unique encryption algorithm, and embedding the terminal identifier and encrypting it within the content for storage therewith.

11. The system of claim 10, wherein said processor module is further configured to wrap said content.

12. The system of claim 10, wherein said processor module is further configured to scramble said content.

13. The system of claim 10, wherein said content comprises bits.

14. The system of claim 10, wherein said user terminal further comprises:

a storage drive in communication with said processor module, wherein said processor module is further configured to store said content on said processor module.

15. The system of claim 14, wherein said processor module is further configured to simultaneously store and display said content.

* * * * *